United States Patent Office 3,392,585
Patented July 16, 1968

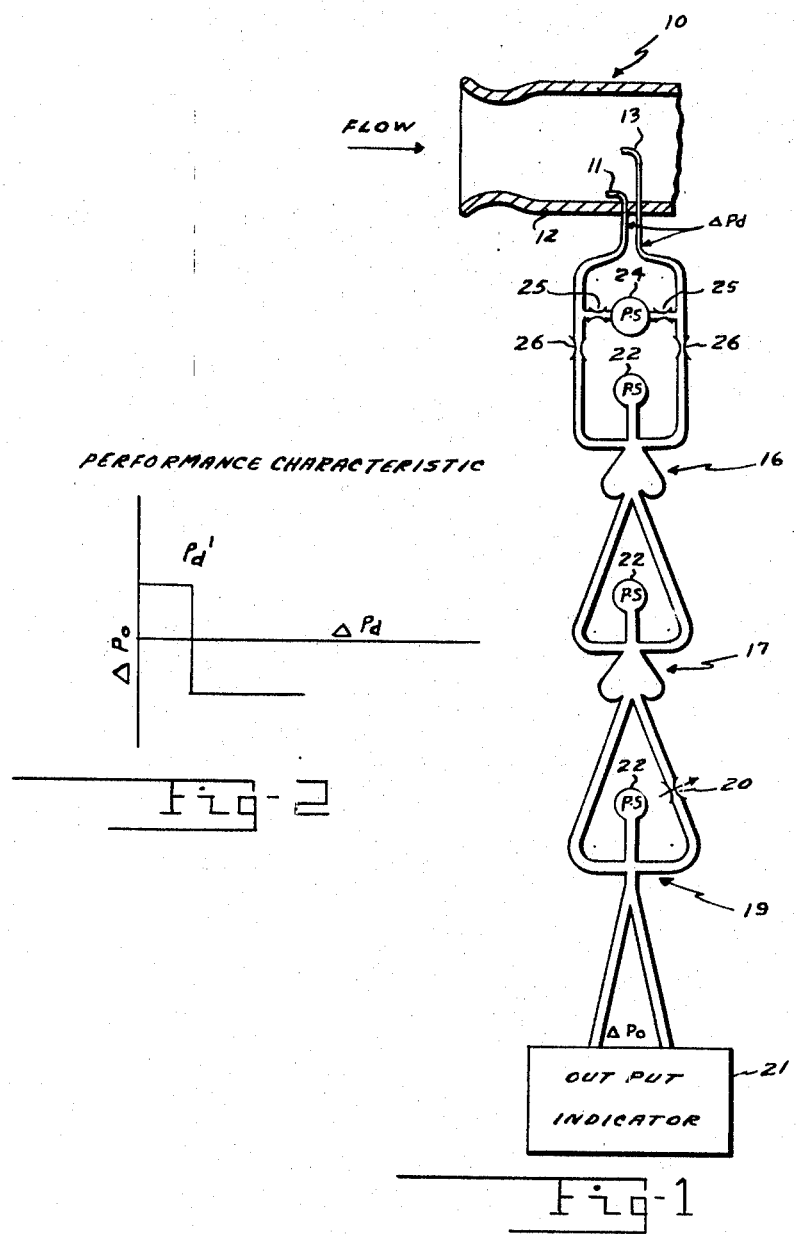

3,392,585
DEVICE FOR SENSING DISTORTION IN THE INLET OF A PROPULSION SYSTEM
Charles E. Bentz, Dayton, Ohio, and Stephen J. Przybylko, South River, N.J., assignors to the United States of America as represented by the Secretary of the Air Force
Filed June 8, 1966, Ser. No. 556,833
3 Claims. (Cl. 73—388)

ABSTRACT OF THE DISCLOSURE

A first pitot is located adjacent the wall of the inlet chamber of an air breathing propulsion system and a second pitot is located in the center of flow through the inlet chamber. The outputs of the pitots are applied to a bistable fluid amplifier with a needle valve provided in one of the inputs of the bistable amplifier to set the switching level of the amplifier. The outputs of the bistable fluid amplifier are applied to a differential pressure indicating device.

---

The invention described herein may be manufactured and used by or for the United States Government for governmental purposes without payment to us of any royalty thereon.

This invention relates to a device for sensing distortion in the flow in the inlet of a turbojet, turboramjet or similar air-breathing propulsion systems.

One object of the invention is to provide a device for indicating inlet distortion in an air-breathing propulsion system in the initial stages of its occurrence so that remedial action can be taken before failure occurs.

This and other objects will become apparent from the following description taken with the drawing, wherein:

FIG. 1 is a schematic diagram partially in block form of a distortion sensing device according to the invention; and FIG. 2 is a graphical illustration of the output of the distortion sensing device of FIG. 1 as a function of differential pressure as sensed by the pressure sensing probes.

No known system is available for indicating a severe pressure profile across the flow in the inlet of an air-breathing propulsion system, indicative of a distortion in flow. According to this invention, a pair of pressure sensing probes are located in the flow stream. One of the pressure probes is located adjacent the wall of the inlet chamber and the other probe is located in the center of flow. The output of the pressure sensing probes, after amplification, is applied to a bistable fluid amplifier. The bistable amplifier is biased to provide switching at a predetermined level of unbalance of pressure between the probes.

Reference is now made to FIG. 1 of the drawing which shows a portion of an inlet chamber 10. A first pitot tube 11 is located adjacent the wall 12 of inlet chamber 10 and a second pitot tube 13 is located in the center of flow through the inlet chamber 10. The outputs of pitot tubes 11 and 13 are applied to a conventional bistable fluid amplifier 19 after amplification in fluid amplifiers 16 and 17. A variable impedance device 20, such as a needle valve, is provided in one of the inputs to the bistable fluid amplifier to provide switching at a predetermined level of unbalance. The output of the bistable fluid amplifier 19 is applied to a differential pressure indicator 21. Fluid power supplies for the amplifiers 16, 17 and 19 are shown schematically at 22.

With the device thus far described air from the chamber 10 may tend to flow through the distortion sensing system. When this is undesirable, a separate fluid power supply 24 may be provided so that there will be a net flow out of pitot tubes 11 and 13. Pressure regulating impedance devices 25 and 26 may be provided when needed. In some cases, the means for providing switching at a desired level of unbalance can be built into the geometry of the system and separate means, such as a valve 20, is not needed. Also static pressure taps may be used for the pressure sensing probes, if desired.

In the operation of the device of the invention, the impedance device 20 is set to provide switching of the bistable fluid amplifier at a predetermined level of unbalance of pressure at pitot tubes 11 and 13. When a severe pressure profile, such as would be caused by flow separation from the wall, occurs the differential pressure is sensed by the sensing devices 11 and 13. The differential output is amplified in amplifying devices 16 and 17 and is then applied to bistable fluid amplifier 19. If the differential pressure signal exceeds the level required to overcome the bias on the amplifier 19, as determined by the setting of impedance element 20, the bistable amplifier switches to its other stable position as shown in FIG. 2. The output signal of the bistable fluid amplifier may be used directly to provide corrective action or may be applied to an indicator to provide a visual indication for the pilot so that he may take the necessary corrective action. When the pressure profile returns to normal and the differential pressure decreases below $P_d'$, as shown in FIG. 2, the bias set by impedance 20 causes the bistable fluid amplifier to switch back to its other stable state.

While the device has been described as used for indicating an undesirable pressure difference, it could also be used to indicate the absence of a desired pressure difference. Also though the device has been described for use in sensing distortion in an air-breathing propulsion system, it is to be understood that it can be used for sensing distortion in the flow through any tubular member.

There is thus provided a device for sensing distortion in the flow in the inlet of an air-breathing propulsion system.

While certain embodiments have been described, it is obvious that numerous changes may be made without departing from the general principle and scope of the invention.

We claim:
1. A device for sensing distortion in the flow through a tubular member, comprising a first pitot tube for sensing the pressure in the center of flow through said tubular member, a second pitot tube for sensing the pressure adjacent the edge of flow through said tubular member, a bistable fluid amplifier, means for applying a signal proportional to the difference from said first and second pitot tubes to said bistable fluid amplifier, said means, for applying the difference signal to said bistable fluid amplifier, including means for causing said bistable fluid amplifier to switch at a predetermined level of pressure difference, output means connected to said bistable fluid amplifier and an indicator connected to the output means for indicating the state of the bistable fluid amplifier.

2. The device as recited in claim 1 wherein means is provided for establishing a net flow out of said pitot tubes into said tubular member.

3. The device as recited in claim 2 including means for controlling the rate of flow out of said pitot tubes.

References Cited

UNITED STATES PATENTS

| | | | |
|---|---|---|---|
| 2,107,976 | 2/1938 | Blasig | 73—407 X |
| 3,038,301 | 6/1962 | Carlson | 73—407 X |
| 3,099,157 | 7/1963 | Wagenseil | 73—407 X |
| 3,129,563 | 4/1964 | Long | 73—407 X |

RICHARD C. QUEISSER, *Primary Examiner.*

JERRY W. MYRACLE, *Assistant Examiner.*